United States Patent
Pannekamp et al.

(10) Patent No.: US 12,511,779 B2
(45) Date of Patent: Dec. 30, 2025

(54) METHOD FOR DETERMINING A THREE-DIMENSIONAL POSE OF AN OBJECT

(71) Applicant: Sensopart Industriesensorik GmbH, Wieden (DE)

(72) Inventors: Jens Pannekamp, Umkirch (DE); Dominik Kult, Stegen (DE)

(73) Assignee: Sensopart Industriesensorik GmbH, Wieden (DE)

( * ) Notice: Subject to any disclaimer, the term of this patent is extended or adjusted under 35 U.S.C. 154(b) by 369 days.

(21) Appl. No.: 18/268,657

(22) PCT Filed: Dec. 21, 2021

(86) PCT No.: PCT/EP2021/087143
§ 371 (c)(1),
(2) Date: Jun. 21, 2023

(87) PCT Pub. No.: WO2022/136467
PCT Pub. Date: Jun. 30, 2022

(65) Prior Publication Data
US 2024/0078698 A1  Mar. 7, 2024

(30) Foreign Application Priority Data
Dec. 23, 2020  (DE) .................... 10 2020 134 898.3

(51) Int. Cl.
*G06T 7/73* (2017.01)
*G06K 7/14* (2006.01)

(52) U.S. Cl.
CPC .............. *G06T 7/73* (2017.01); *G06K 7/1417* (2013.01); *G06T 2207/30204* (2013.01)

(58) Field of Classification Search
CPC ............ G06T 7/73; G06T 2207/30204; G06K 7/1417; G06K 19/06037; G05B 2219/40543; B25J 9/1612; B25J 9/1697
USPC ......................................................... 382/103
See application file for complete search history.

(56) References Cited

U.S. PATENT DOCUMENTS

| | | |
|---|---|---|
| 6,017,125 A | 1/2000 | Vann |
| 6,167,607 B1 | 1/2001 | Pryor |
| 2014/0009604 A1 | 1/2014 | Hinderling et al. |
| 2015/0224650 A1 | 8/2015 | Xu et al. |
| 2017/0095930 A1 | 4/2017 | Warashina et al. |
| 2020/0125872 A1 | 4/2020 | Jensen |

(Continued)

FOREIGN PATENT DOCUMENTS

| | | | |
|---|---|---|---|
| DE | 102010034875 A1 | 1/2012 | |
| DE | 102015208445 A1 * | 11/2016 | ............. G05D 1/102 |

(Continued)

*Primary Examiner* — Jerome Grant, II
(74) *Attorney, Agent, or Firm* — Smartpat PLC

(57) ABSTRACT

A target marker (1) for determining a three-dimensional pose of an object (4) has a predetermined number of encoding modules (2). The encoding modules (2) of the target marker (1) are present in a defined module pattern (10) that encodes a character string that includes specific information that defines object parameters of the object (4), selected from the group comprising at least a size of the target marker (1) and/or gripping parameters for gripping the predetermined object (4) from the group comprising at least a gripping pose of a gripper, a gripper geometry, and gripper forces.

6 Claims, 1 Drawing Sheet

(56) References Cited

U.S. PATENT DOCUMENTS

| | | | |
|---|---|---|---|
| 2020/0159313 | A1 | 5/2020 | Gibby et al. |
| 2021/0107750 | A1 * | 4/2021 | Iino et al. |
| 2021/0333384 | A1 * | 10/2021 | Yamazaki ................ G06T 7/55 |
| 2022/0409991 | A1 * | 12/2022 | Ohashi .................... A63F 13/26 |
| 2024/0248530 | A1 | 7/2024 | Gibby et al. |

FOREIGN PATENT DOCUMENTS

| | | | | |
|---|---|---|---|---|
| DE | 102015212352 | A1 | 1/2017 | |
| DE | 102016011653 | A1 | 4/2017 | |
| EP | 2523017 | A1 | 11/2012 | |
| JP | 2007090448 | A | 4/2007 | |
| JP | 2008309530 | A | 12/2008 | |
| JP | 2019188756 | A | 10/2019 | |
| KR | 20210020279 | * | 12/2021 | .............. G06T 7/73 |
| WO | 02097362 | A1 | 12/2002 | |
| WO | 2019093328 | A1 | 5/2019 | |
| WO | 2020102761 | A1 | 5/2020 | |

\* cited by examiner

METHOD FOR DETERMINING A THREE-DIMENSIONAL POSE OF AN OBJECT

CROSS-REFERENCE TO RELATED APPLICATION

This application is a national stage application, filed under 35 U.S.C. § 371, of International Patent Application PCT/EP2021/087143, filed on Dec. 21, 2021, which claims the benefit of German Patent Application DE 10 2020 134 898.3 filed on Dec. 23, 2020.

TECHNICAL FIELD

The disclosure relates to a method for determining a three-dimensional pose of an object.

BACKGROUND

Attaching target markers to components is known from the prior art, for example from DE 10 2016 011 653 A1, which describes a robot system that can measure a position of a target point using a target marker made of simple geometric shapes. The system stores feature sizes of an image of a target marker contained in a captured image as reference data when the target marker is located at a known first target marker position in the robot coordinate system, and stores the first target marker position relative to an arm end as a tool center position. The system compares the feature sizes obtained from the captured image when the target marker is placed in a second target marker position with the feature sizes of the reference data to cause the arm end to move and calculates the second target marker position in the robot coordinate system based on a second robot position, which corresponds to the position of the arm end after the movement, and the position of the tool center point. Target markers in form of identification markers are further described in US 2015/224 650 A1 and US 2020/125 872 A1.

EP 2 523 017 A1 discloses a calibration method for a device with scanning functionality that measures in polar coordinates, in which angle target markers in the form of simple geometric markers are used to determine the position of a component in space by detecting the angle target markers with an optical sensor unit.

Furthermore, WO 2020/102 761 A1 discloses a visualization method of the human body, in which a patient's body can be measured by applying two-dimensional codes to their body. It is about positioning a medical tool in relation to a patient. 2D barcodes, QR codes or AprilTags are known as two-dimensional codes.

So far, such target markers have been purely identification marks for robots with detection devices, such as optical sensor units, which recognize these points on the object (component) that is to be detected and worked on and, from this, derive the three-dimensional pose, i.e. the position and inclination (degrees of freedom of translation and the rotation) of the respective object and make it available to the robot. The three-dimensional pose is determined by comparing the prior known geometry of the target marker with the recorded image of the target marker, taking into account a previously performed calibration of the sensor unit. In order to carry out a gripping process, gripping poses relative to the target marker must be taught in. These gripping poses are object-specific, which means that the setup effort increases with a growing number of non-identical components.

SUMMARY

It is the object of the present disclosure to provide an improved method that enables an improved determination of the three-dimensional pose of an object in relation to a robot. This object is achieved by a method as claimed.

A first embodiment of the method for determining a three-dimensional pose of an object uses an optical sensor unit for capturing the object, wherein the sensor unit is connected to a data processing unit, comprising the step:
providing a target marker for determining a three-dimensional pose of an object, wherein the target marker has a predetermined number of encoding modules that are present in a defined module pattern encoding a character string of predetermined length comprising specific information defining object parameters of the object and selected from a group comprising at least a size of the target marker. In combination or alternatively, the specific information define gripping parameters for gripping the predetermined object; these are selected from the group comprising at least one gripping pose of a gripper, a gripper geometry, and gripper forces.

Further comprising the step:
arranging the target marker on the object;
positioning the optical sensor unit in front of the object such that it is in a detection range of the optical sensor unit and, by means of the optical sensor unit, detecting the target marker on the object;
determining the centers of the module patterns of the target marker by means of a data processing unit, and reading out the specific information;
determining a hypothetical three-dimensional pose of the target marker on the object on a basis of the specific information in the data processing unit,
continuously varying the hypothetical three-dimensional pose of the target marker until the center of the module pattern coincides with the determined center of the module pattern, thus determining the actual three-dimensional pose of the target marker.

The specific information encoded on the target marker according to the invention can thus contain either object parameters or gripping parameters. Alternatively, the specific information includes a combination of object parameters and gripping parameters. The determination of a three-dimensional pose of an object using the said target marker, with the target marker being arranged on the predetermined object, is therefore carried out using an optical sensor unit for capturing the object, which is operatively coupled to a data processing unit. The optical sensor unit can be a calibrated 2D camera, with each pixel of the 2D camera being assigned an image ray in space, so that an assignment can be made between the image point and physical objects in space and that the coordinate systems of the robot that is to move to the object, and camera are aligned with each other.

"Three-dimensional pose" herein refers to the values of the three degrees of freedom of translation and also the values of the three degrees of freedom of rotation, which are position and tilt or angular orientation of an object relative to a robot or robot arm.

As used herein, "character string" refers to a sequence of alphanumeric characters, which may consist purely of digits or letters, or a combination of both. The character string can be numbered consecutively, and each position of the character string can be assigned specific information.

"Size of the target marker" herein means the grid dimensions of the module pattern.

The specific information that can be coded into the target marker can be expanded as desired in an object-specific manner. It is not necessary to teach gripping poses in advance, as is required by the prior art, since the target marker itself brings along all the information required for recognizing and/or gripping the object. The object therefore does not have to be known in advance, but can be recognized and gripped using the information encoded in the target marker. The module pattern indicates the encoded character string of predetermined length, with the specific information being able to be encoded at predetermined positions. Advantageously, the target marker according to the invention enables the three-dimensional object pose, i.e., the position, angular orientation, and geometry of the object to be recognized absolutely in space without knowing the size of the target marker in advance. The size information of the module pattern can be deduced directly from the target marker. The physical size of the target marker, i.e., the grid dimensions of the modules, is encoded, which makes it possible to localize the object or its pose with target markers of different sizes without an external size query or prior teaching of the size information being necessary. This is particularly helpful when the target markers in the form of 2D codes are attached to a large number and in different code sizes on the objects, the number of objects or the module sizes are not fixed in advance, which makes object recognition much simpler.

Furthermore, the various gripping parameters of an object are encoded in the target marker for improved gripping of objects. A gripper's gripping pose also includes the orientation and dimensions of how far a gripper should be opened to grip the object. Furthermore, based on the position of the target marker on the object, an offset to a gripping point of the object can be encoded as a relative gripping pose, or the closing forces can also be stored. The gripping can take place with any gripper, preferably with special grippers such as suction grippers or jaw grippers of robots or robotic arms. Further information relating to the gripper can be stored in the gripper geometry, which can also be encoded, e.g., the type of gripper to be used. The object to be gripped therefore already has the parameters required for the gripping process, so that these parameters do not have to be taught in beforehand. The gripping process is thus supported by the target marker.

The target markers can be designed as ECC200, QR code or also as AprilTag. These forms offer an optimal basis for coding the different object information. In order to achieve good visibility, the target markers can be attached as direct markings or on a carrier. Direct marking is particularly advantageous for series production components, where the target markers can be directly printed, milled, or lasered onto or into the component. The version of the code on a carrier, such as for example a sticker or screw-on plate that carries the target marker, is suitable for goods carriers, among other things.

In a further embodiment of the method according to the invention, the module patterns of the target marker are encoded in consecutive numbering with an identification number, as a result of which they are provided with a unique identification ID. In this way, further information can be unambiguously assigned to each target marker, even if this is not stored in the code. For example, the gripping parameters cannot be encoded directly in the target marker, but can be available in an externally stored table or database (e.g., in a cloud) and linked via the identification number. This is particularly advantageous for objects that require a certain degree of flexibility in the gripping process. It is then sufficient to determine the ID and then read the module size or other gripping parameters from the database. A purely numerical coding can also be used for the target marker, with X characters for the identification ID, Y characters for the "module size" information, Z characters for the "relative gripping pose" information, etc. being used. If more information, i.e., more characters, is to be stored in the target marker, the number of module patterns or encoding modules must increase; a 12×12 target marker (relative to the encoding modules) can thereby encode ten decimal places. A higher information density requires a correspondingly higher number of encoding modules.

In yet another embodiment of the method according to the invention, the shape of the target marker is square or circular. Furthermore, the shape of the module pattern or the encoding modules can be square or circular. In particular with circular encoding modules or also module patterns, a precise determination of the center of the code modules is facilitated and the computing time required for position determination is reduced.

In a preferred embodiment of the method according to the invention, the target marker can have a background on which the encoding modules are arranged. This background is preferably an optically neutral background. "Neutral" here means that the background is such that the encoding modules can stand out with high contrast and can therefore be easily detected by an optical sensor unit. For example, the background can be a white surface on which black encoding modules are present. The target marker thus specifies a light/dark pattern that corresponds to a character string of a predetermined length. In the case of target markers introduced into the object material, this can also be represented by raised encoding modules in front of a background that is milled out, for example.

In yet another embodiment of the method according to the invention, the encoding modules are retroreflective. This can also apply to the background or the entire target marker. A retroreflective configuration, which corresponds to the cat's eye principle, offers the advantage that greater working distances can be achieved when lighting is built into the optical sensor unit, since the light emitted by the lighting is reflected back to the optical sensor unit regardless of the angle of incidence.

Other embodiments of the method with the target marker, as well as some of the advantages associated with these and other embodiments, will become apparent and better understood from the following detailed description with reference to the accompanying figures. The figures are only a schematic representation of an embodiment of the invention.

DETAILED DESCRIPTION

Figure 1:
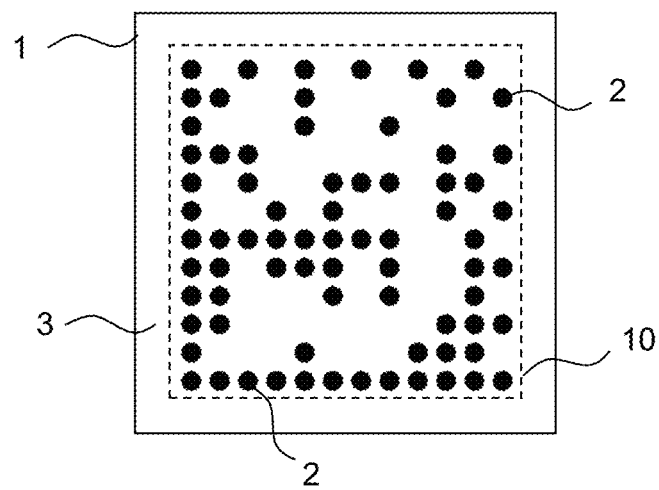
FIG. 1 shows a target marker.

FIG. 1 shows a target marker 1 which comprises a plurality of encoding modules 2 on an optically neutral background 3. The encoding modules 2 are arranged in such a way that they convey certain, specific information in coded form. The specific information that can be encoded on the target marker 1 contain either object parameters such as, e.g., a size of the target marker 1, or gripping parameters that include, for example, a gripping pose of a gripper, a gripper geometry, and gripper forces. Alternatively, the specific information includes a combination of object parameters and gripping parameters.

This is as follows in FIG. 1, wherein only size information of the target marker 1 but no gripping parameters of the object 4 are encoded in the shown target marker 1.

The encoding modules 2 of the target marker 1 are combined in a module pattern 10 (exemplarily outlined in dashed lines in FIG. 1), which each encode ten decimal digits "1 to 10," with these ten digits "1 to 10" being able to be assigned the following meanings, for example:

For example, the digits "1" and "2" could indicate a target subtype, e.g., the type of object to be located, or they provide additional information that facilitates internal processing of the information encoded in target marker 1.

The numbers "3" and "4" are used to provide information about the module spacing (grid dimensions). The module spacing is specified, for example, by two decimal digits, which are mapped to millimeters in this way, for example by the relation (X+1)*0.5, with X representing millimeters. Thus, a range from 0.5 mm up to 50 mm can be coded by X=0 . . . 99.

The digits "5" to "10" in this example are used to encode the target identifier (ID). With these five decimal places, unique IDs for one million target markers can be generated. If the subtype is omitted, 100 million unique target markers can be generated with 8 decimal places. Target markers with more encoding modules offer the possibility of generating even larger quantities of unique target markers.

Figure 2:
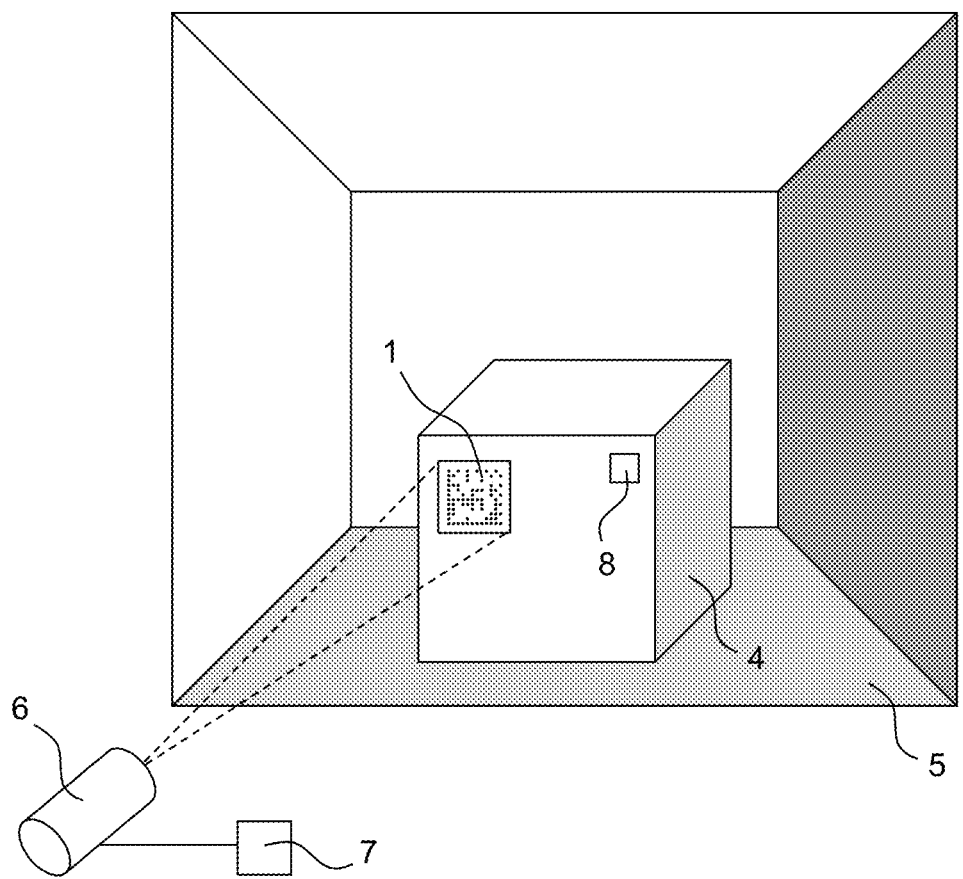
FIG. 2 shows a schematic arrangement of the target marker on an object in a space.

In FIG. 2 an object 4 is arranged in a space 5. The target marker 1 is attached to the object 4, whereby it can be recognized by means of an optical sensor system 6 and evaluated by means of a data processing unit 7 connected thereto. The attached target marker 1 alone is sufficient to recognize the three-dimensional pose of the target marker 1 and the gripping parameters 4 in the space 5. The space dimensions or other space-specific parameters are not required. A gripping position for a gripper can be given by a gripping point 8, which is shown in FIG. 2 in the form of a flag. The gripping point 8 represents a good gripping point for gripping the object 4 and is encoded in the target marker 1 with a corresponding relative pose.

REFERENCE SIGN LIST 1 target marker
2 encoding module
3 background
4 object
5 space
6 optical sensor unit
7 data processing unit
8 gripping point
10 module pattern

The invention claimed is:

1. A method for determining a three-dimensional pose of an object (4) by using an optical sensor unit (6) for capturing the object (4), the optical sensor unit (6) being connected to a data processing unit (7), the method comprising:
providing a target marker (1) for determining a three-dimensional pose of an object (4), wherein the target marker (1) has encoding modules (2) that are present in a defined module pattern (10) that encodes a character string comprising specific information that defines a size of the target marker,
and/or
gripping parameters for gripping the object (4) selected from the group consisting of a gripping pose of a gripper, a gripper geometry, and gripper forces;
arranging the target marker (1) on the object (4);
positioning the optical sensor unit in front of the object (4) such that the object (4) is in a detection range of the optical sensor unit and, by the optical sensor unit, detecting the target marker on the object;
determining centers of the module patterns of the target marker by the data processing unit, and reading out the specific information;
determining a hypothetical three-dimensional pose of the target marker on the object (4) based on the specific information in the data processing unit; and
continuously varying the hypothetical three-dimensional pose of the target marker until the center of the module pattern coincides with the
determined center of the module pattern, thereby determining an actual three-dimensional pose of the target marker.

2. The method according to claim 1,
wherein the module patterns (10) are encoded in consecutive numbering, the numbering being in form of a unique identification (ID).

3. The method according to claim 1, wherein
a shape of the target marker (1) is square or circular, and/or
a shape of the module pattern (10) and/or the encoding modules (2) are/is square or circular.

4. The method according to claim 1, wherein
the target marker (1) has a background (3) on which the encoding modules (2) are arranged.

5. The method according to claim 4,
wherein the encoding modules (2) and/or the background (3) of the target marker (1) are retroreflective.

6. The method according to claim 1,
wherein the character string comprises information that defines the size of the target marker and the gripping parameters.

* * * * *